United States Patent [19]

Gamache et al.

[11] Patent Number: 5,193,120
[45] Date of Patent: Mar. 9, 1993

[54] MACHINE VISION THREE DIMENSIONAL PROFILING SYSTEM

[75] Inventors: Ronald W. Gamache, East Greenbush; John A. Tourtellott, Latham, both of N.Y.

[73] Assignee: Mechanical Technology Incorporated, Latham, N.Y.

[21] Appl. No.: 661,679

[22] Filed: Feb. 27, 1991

[51] Int. Cl.$^5$ .............................................. G06K 9/00
[52] U.S. Cl. ........................................ 382/1; 340/729; 395/119; 356/376
[58] Field of Search .................. 382/1; 356/376, 3; 395/119; 340/729

[56] References Cited

U.S. PATENT DOCUMENTS 5,056,914 10/1991 Kollodge .......................... 356/376

Primary Examiner—Leo H. Boudreau
Assistant Examiner—Chris Kelley
Attorney, Agent, or Firm—Kane, Dalsimer, Sullivan, Kurucz, Levy, Eisele and Richard

[57] ABSTRACT

A three dimensional imaging system having a diode laser and collimator along with a video camera and digital circuitry wherein when the light from the laser is collimated and hits the surface of an object with the reflected light images picked up by the video camera and the centroid location of each intersection is interpolated translating two dimensional pixels into three dimension coordinates.

5 Claims, 3 Drawing Sheets

MACHINE VISION THREE DIMENSIONAL PROFILING SYSTEM

FIELD OF INVENTION

The present invention is directed towards a system for providing a three dimensional profile of an item, particularly through the non-contact measurement thereof.

BACKGROUND OF THE INVENTION

In various manufacturing and processing procedures it is desirable to measure the surface form of a material for quality control or other processing aspects. Often times such analysis is done manually however in certain applications a non-contact analysis is desirable. For example in U.S. Pat. No. 4,710,808 there is provided a means of determining the thickness of an object through the use of a differential measurement system. The system provides such measurement through the use of structured light from two sources projected along a common axis at opposite surfaces of an object. The images formed are monitored by the two sources of light which detect the distance from a feature of each of the images to a reference point. The thickness of the object is proportional to the sum of the distances if the reference point is within the sheet of material and if not, then it is the difference of the distances.

While such a system has proven very satisfactory it is desired to provide a display which provides for a three dimensional measurement of the surface of an object.

SUMMARY OF THE INVENTION

It is therefore a principal object of the invention to provide for a system of measuring accurately a surface of an object and provide a profile of said surface in a three dimensional form.

It is a further object of the invention to provide such a profile in an accurate manner which adjusts for deviation in light intensity due to changes in surface reflectivity and orientation.

It is a yet further object of the invention to provide for such a system which is relatively simple but which provides the desired results.

The present invention provides for an array of lights projected onto the surface of the object being tested to generate a three dimensional measurement. In this regard a array of lines of light are projected onto the test object and are imaged by an image processing system. The three dimensional profile of the object being tested is determined by the imaged lines of light. A laser is used as a light source with a collimator converting the divergent output thereof into a collimated beam. This beam in turn is then diffracted into multiple parallel lines in light that are projected onto the target. The image processing system determines the central position along the lines of lights.

A digital processor is used to transform each centered location from two dimensional pixels to three dimensional coordinates. The processing combines the optical magnification and other properties of the imaging system with the geometry of the lines of lights to determine the three dimensional coordinates. Variations of the invention such as increased pulsing of the laser, feedback to the laser and replacing the grating with a hologram are envisioned.

BRIEF DESCRIPTION OF THE DRAWINGS

Thus by the present invention its objects and advantages will be realized the description of which should be taken in conjunction with the drawings wherein.

DETAILED DESCRIPTION OF THE PREFERRED EMBODIMENT

Figure 1:
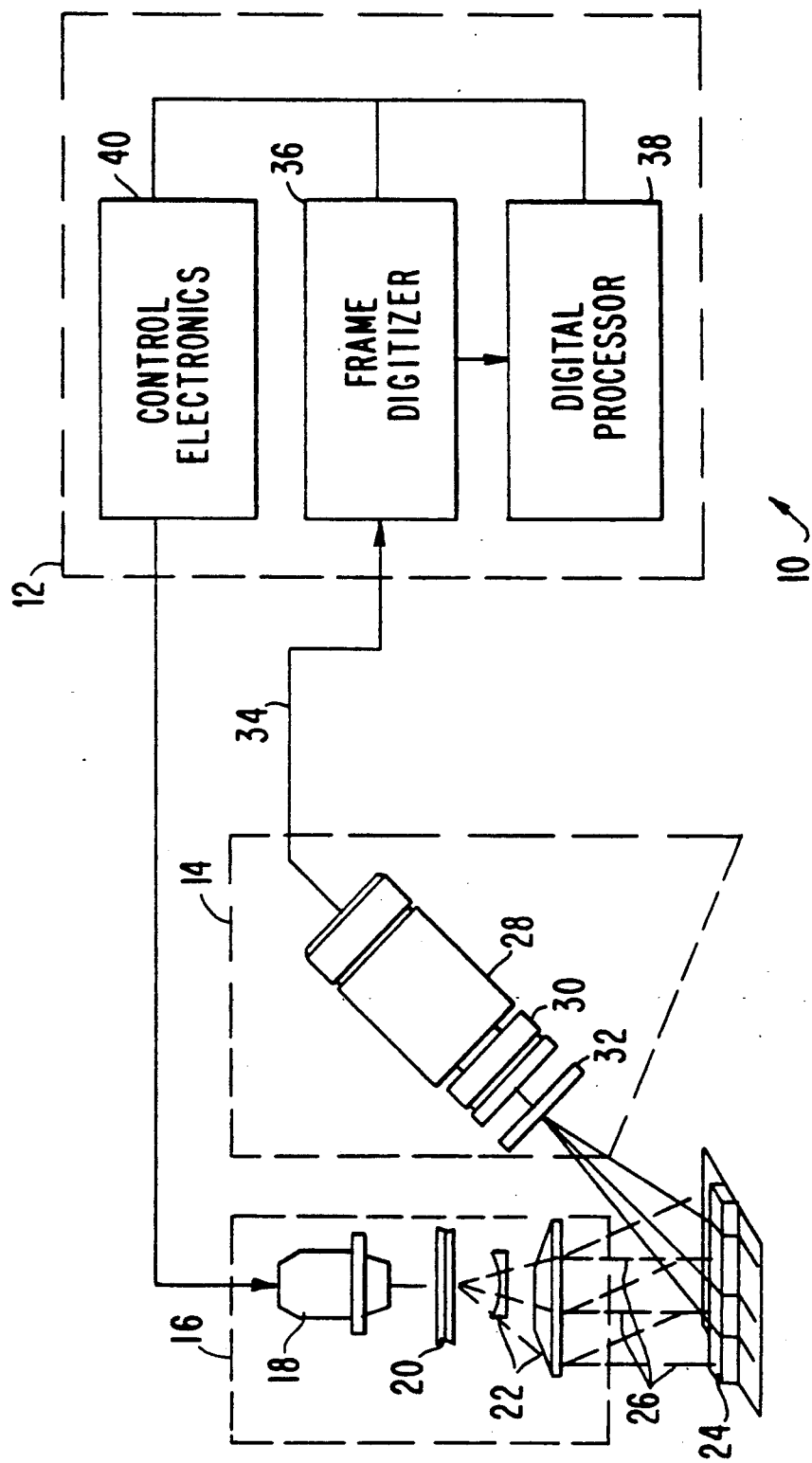
FIG. 1 is a somewhat schematic representation of three dimensional profiling system, incorporating the teachings of the present invention.

Turning now more particularly to the drawings, in FIG. 1 there is shown the three dimensional profiling system 10. The system 10 includes an image processing system 12, an imaging system 14 and a structured light projection system 16. The light projection system 16 comprises a diode laser and collimator 18, a grating 20, and cylindrical lenses 22 positioned above a test object 24. The lines of light emanating from the lenses 22 are indicated by numeral 26.

The imaging system 14 is made up of a video camera 28, an imaging lens 30 and an optical filter 32. The output or video signal of the imaging system 14 is sent to the image processing system by way of connection 34 which is coupled to a frame digitizer 36. Digitizer 36 is coupled to a digital processor 38, all of which are coupled to control electronics 40. The control electronics 40 are also coupled via 42 to the laser and collimator 18.

The system 10 works with an array of lines of light 26 (i.e. structured light pattern) projected onto the test object 24 by the structured light projector 16. The lines of light are imaged by the imaging system 14. The imaging system 14 views the lines of light at an angle with respect to the structured light projection 16, so that the profile of the test object 24 can be visualized. The output of the imaging system 16 is a video signal 34 which is input to the image processing system 12. The image processing system 12 calculates the three dimensional profile of the test object 24 based on the images lines of light as will be discussed.

The structured light projector 16 includes the diode laser 18 as the light source. The collimator transforms the divergent output of the diode laser 18 into a collimated beam. The diffraction grating 20 creates multiple output beams from the input laser beam. A fiber-element grating for uniform intensity among the output beams is preferred however other types of gratings could also be used.

The two cylindrical lenses 22 reshape the light output from the grating 20. One cylindrical lens stretches each light beam from a small elliptical cross section into a long line of light. The second cylindrical lens performs two functions. First it focuses each line of light onto a thin line of light that is projected onto the object 24. Second it transforms the diverging lines of light into parallel lines of light. This second function while not mandatory for implementation, provides a convenient projection geometry.

In the imaging system 14 the camera and lens are standard elements in structured light systems. The optical interference filter 32 serves to block out all light that is not at the laser wavelength. This improves image contrast and consequentially improves overall measurement accuracy.

Figure 2:
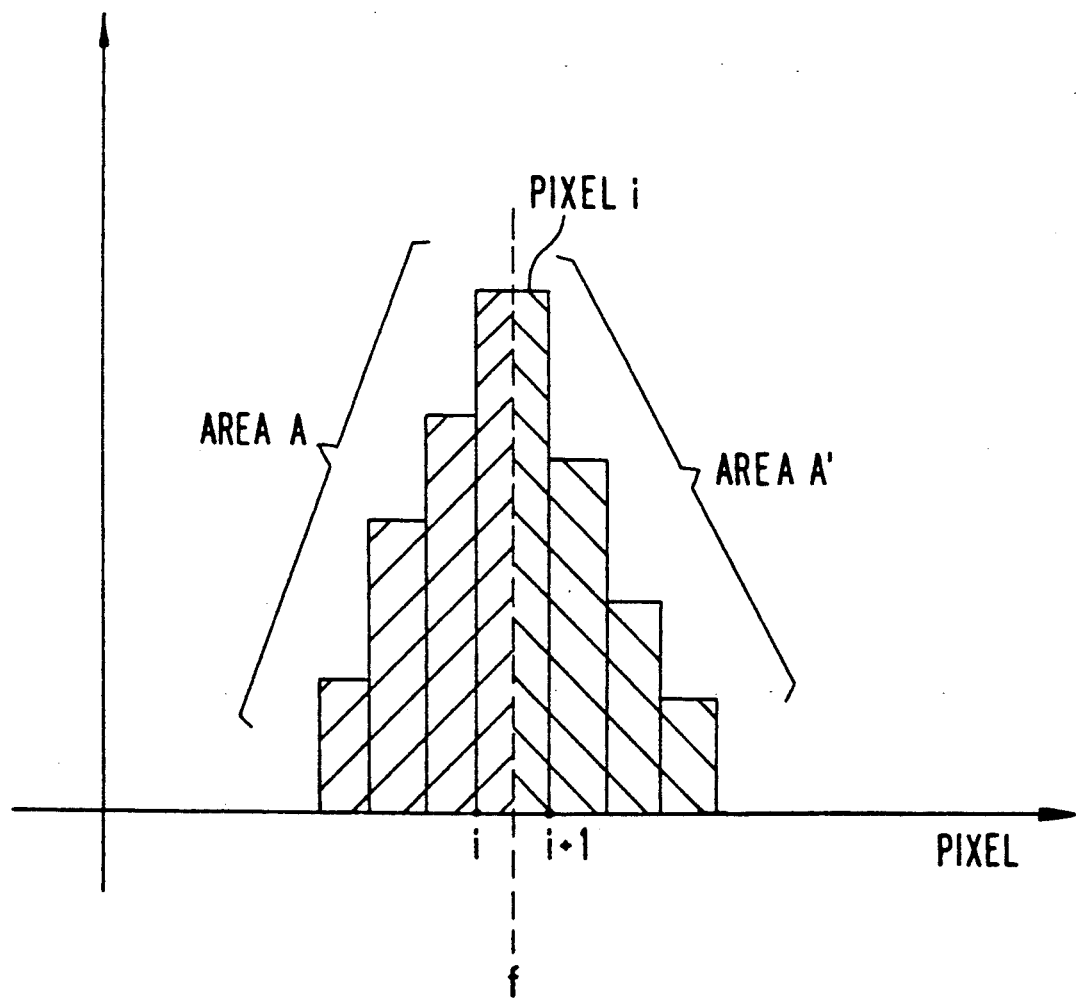
FIG. 2 is a graphical illustration of the determination of the centroid, incorporating the teachings of the present invention.

The image processing system 12 is used to determine the centroid position at points along the lines of light. The frame digitizer 36 transforms the input video signal 34 into a pixel array at specified pixel rows to determine the intersection of the specified rows with each line of light. The centroid location of each intersection is interpolated to sub-pixel resolution. This is diagrammed in FIG. 2. The interpolation is based on the symmetry of the laser beam intensity distribution. At some point f within a pixel i, the sum of the pixel intensities, including a proportional allocation for pixel i to either side of f, on either side of the point f will be equal (i.e. when A=A' the centroid is found at f). That point f, within pixel i, represents the centroid of the laser beam.

Figure 3:
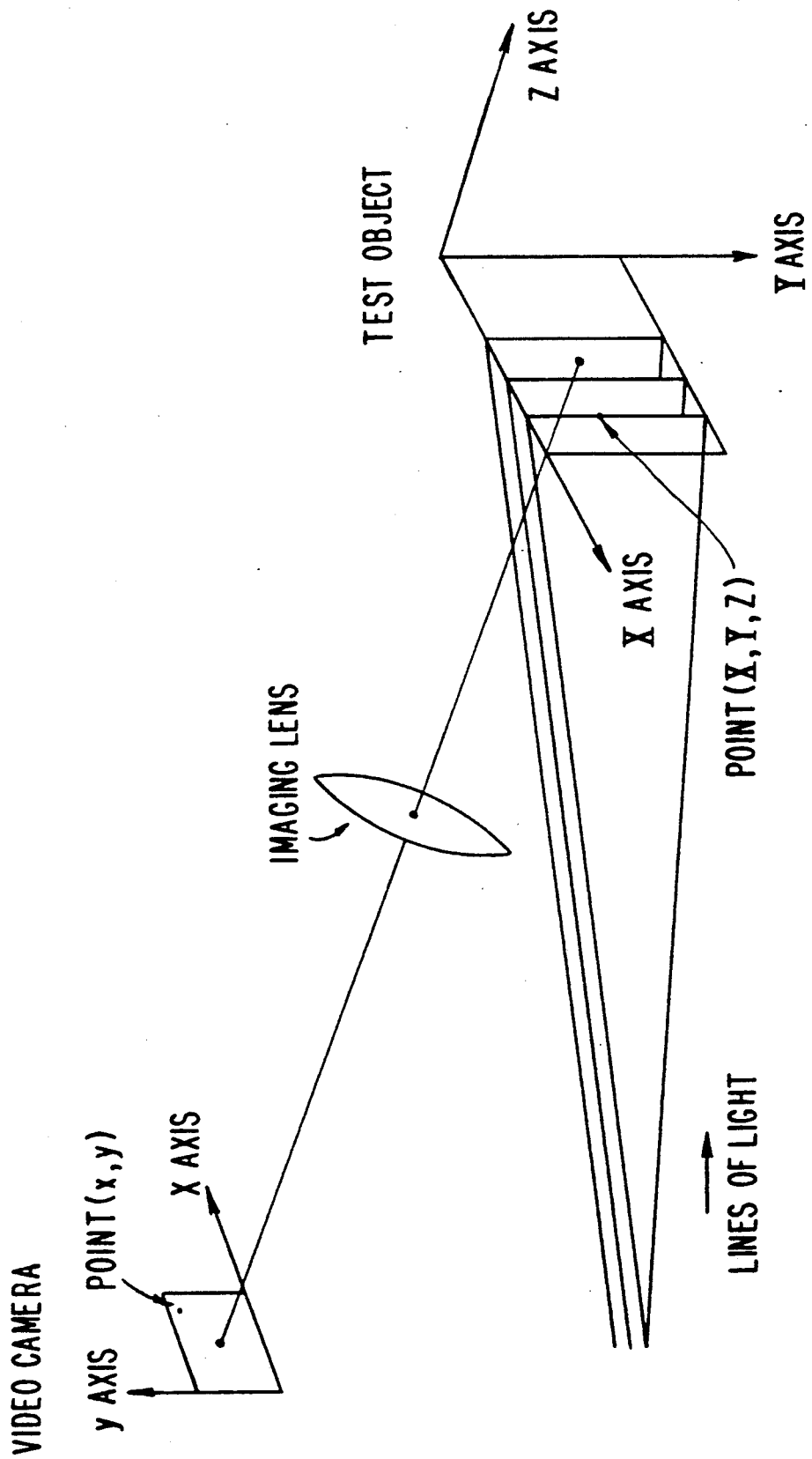
FIG. 3 is a schematic illustration of the transformation from an image point to a three dimensional point incorporating the teachings of the present invention.

Further processing by the digital processor is used to transform each interpolated centroid location from 2 dimensional pixels to three dimensional coordinates such as inches or mm. In the nomenclature of FIG. 3, this transformation is from image point (x,y) to three dimensional point (X,Y,Z). This processing combines the optical magnification of the imaging lens with the geometry of the lines of light. The equations for optical magnification are:

$$X = m^*x + m^*e^*x^3 + (dm/dz)^*Z$$

$$Y = m^*y + m^*e^*y^3 + (dm/dz)^*Z$$

where m is the optical magnification and e is the optical distortion. The first term in each equation represents first order optical magnification. The second term provides a correction for optical distortion in the imaging system. The third term is a correction for the change in magnification that occurs at different working distances between the imaging system and test surface. The lines of light can be described by the equation of a geometric plane:

$$a^*X + b^*Y + c^*Z = 1$$

These three equations can be solved simultaneously to find (X, Y, Z). This system can be used then to generate successive images of the test object in a three dimensional manner.

Calibration of the profiling system is the process of finding the appropriate values of parameters (m, e, dm/dz, a, b, c) in the above equations that provide the correct mapping of image points (x, y) to 3-dimensional points (X, Y, Z). One method for finding these parameters uses a flat surface as a reference target. The reference target is aligned perpendicular to the Z-axis at some arbitrary position selected to represent Z=0. Image points (x, y) are acquired from the profiling system at different points along the light images. The reference target is then translated to other positions in Z, and additional image points are acquired. The result is a set of triplets (x, y, Z). Using the three equations presented above, a single equation can be derived which defines Z as a function of x, y, and the calibration parameters (m, e, dm/dz, a, b, c). This equation is used as the basis for calibrating the parameters. A numerical method such as Simplex may be used to find the most suitable values of calibration parameters that provide the minimum error in calculated Z values for each of the (x, y, Z) triplets.

Note, the diode laser 18 may be pulsed for a short time (e.g. 100 microseconds) during each measurement interval to effectively eliminate blur caused by motion of the target. In addition the system 10 may include a feedback provision 42 for controlling the laser output power amplitude based on the brightness of the signal imaged by the video camera 28. In this manner the system can automatically compensate for variations in target reflectively and thus expand the range of targets over which accurate measurements can be made. The laser 18 output power is controlled by the control electronics 40 within the image processing system 12.

A transmission hologram could also replace the grating 20 within the structured light projector 16. A hologram could be designed to map the input light to more uniform output distribution than is possible with a grating.

With the following system since a laser light source is used for the structured light illuminator, instead of a white light source with thin slit such as that shown in U.S. Pat. No. 4,710,808, the monochromatic laser light can be focused to smaller line widths than ordinary white light. Also the laser intensity distribution is predictable (Gaussian distribution), and is consequentially measured more precisely than a white light projection. In addition, since the laser source is implemented by a semiconductor diode laser, it can be pulsed in synchronization with the video camera. By pulsing the diode laser for very short intervals, the effective aperture time of the sensor is reduced, so that fast moving targets can be measured without blurring. Moreover, the diode laser may be amplitude modulated according to the brightness of the image data received from the video camera. This feedback mechanism provides automatic compensation for variations in target reflectivity, increasing the range of targets that can be measured.

The light projector provides for multiple laser lines projected and measured in one camera frame, which enables a higher measurement throughout. The generation of the multiple laser projections may be accomplished by use of a fiber-element diffraction grating, so that rotating mirrors or other moving parts are not required.

In addition, the present system provides for a suitable mathematical model so that complete X,Y,Z data can be calculated from the image data. The system also allows for precisely locating the image of a laser line. This provides sub-pixel resolution with less computational burden than classical convolution.

The optical interference filter 32 may also be tuned to the laser wavelength, to improve image contrast in the video image, consequentially improving measurement precision.

Thus by the present invention, its objects and advantages are realized and although a preferred embodiment has been disclosed and described in detail herein, its scope should not be limited thereby, rather its scope should be determined by that of the amended claims.

What is claimed is:

1. A system for generating a three dimensional image of an object comprising
   light projector means for generating lines of light onto an object;
   imaging means, including an imaging lens, for viewing the lines of light at points along said lines at an angle to provide a profile of the object and providing an output corresponding to an image of the lines of light reflected from the object;
   processing means for processing the output from the imaging means at points along the lines of light, said processing includes determining centroids for said points generating a two dimensional image point defined by the ordered pair (x, y) and transforming said image point to a three dimensional point; and wherein said processing means utilizes optical magnification of said imaging lens and the geometry of the lines of light to process the image points in the following manner:

$$X = m^*x + m^*e^*x^3 + (dm/dz)^*Z$$

$$Y = m^*y + m^*e^*y^3 + (dm/dz)^*Z$$

where m is the optical magnification and e is the optical distortion and the equation for the geometry of lines in a geometric plane is $$a^*X + b^*Y + c^*Z = 1$$

where a, b, and c are calibration parameters; and wherein by solving these equations simultaneously image coordinates X, Y, Z are determined; and means for generating said three dimensional image based on the coordinates determined by said processing means.

2. The system in accordance with claim 1 wherein said light projector means includes a laser and the image processing means includes a video camera and said laser is pulsed in synchronization with the video camera to remove blurring when the object is moving.

3. The system in accordance with claim 2 which includes optical filter to improve image contrast and measurement precision.

4. The system in accordance with claim 2, which includes feedback means coupled to the laser to provide amplitude modulation thereof based on variations in the objects reflectively.

5. The system in accordance with claim 1 wherein a numerical simplex method is used to determine calibration parameters to provide a minimum error in calculating Z values for the image coordinates.

* * * * *